(12) United States Patent
Jang (10) Patent No.: US 9,910,420 B2
(45) Date of Patent: Mar. 6, 2018

(54) EXPANSION MODULE FOR PROGRAMMABLE LOGIC CONTROLLER USING USB COMMUNICATION

(71) Applicant: LSIS CO., LTD., Anyang-si, Gyeonggi-do (KR)

(72) Inventor: Hyun Woo Jang, Cheonan-si (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 362 days.

(21) Appl. No.: 14/702,577

(22) Filed: May 1, 2015

(65) Prior Publication Data

US 2015/0331823 A1    Nov. 19, 2015

(30) Foreign Application Priority Data

May 13, 2014    (KR) .................. 10-2014-0057035

(51) Int. Cl.
  *G05B 19/05*    (2006.01)
  *G06F 13/40*    (2006.01)

(52) U.S. Cl.
  CPC ......... *G05B 19/05* (2013.01); *G06F 13/4022* (2013.01); *G06F 13/4068* (2013.01)

(58) Field of Classification Search
  CPC .. G06F 13/4022; G06F 13/4068; G05B 19/05
  See application file for complete search history.

(56) References Cited

U.S. PATENT DOCUMENTS

| 2003/0005196 A1* | 1/2003 | Reed ................... G05B 19/05 710/300 |
| 2004/0030742 A1* | 2/2004 | Kitagawa ............ H04L 69/18 709/203 |
| 2007/0180181 A1* | 8/2007 | Chen ................... G06F 13/426 710/313 |
| 2007/0255885 A1* | 11/2007 | Bohm ................. G06F 13/4022 710/316 |
| 2015/0227485 A1* | 8/2015 | Maung ................ G06F 13/4022 710/316 |

FOREIGN PATENT DOCUMENTS

| CN | 1380615 | 11/2002 |
| CN | 1672139 | 9/2005 |
| CN | 102681481 | 9/2012 |
| CN | 103389957 | 11/2013 |

OTHER PUBLICATIONS

State Intellectual Property Office of the People's Republic of China Application Serial No. 201510297313.2, Office Action dated Jun. 26, 2017, 5 pages.

* cited by examiner

*Primary Examiner* — Tim T Vo
*Assistant Examiner* — Harry Wang
(74) *Attorney, Agent, or Firm* — K&L Gates LLP (57) ABSTRACT

An expansion module for a PLC, used in such a manner that at least one expansion module is sequentially connected to a basic unit in order to exchange massive data at high speed by using USB communication, is provided. Each of the expansion module includes a USB hub and a USB device, and is allocated with an exchange number from a USB host of the basic unit by activating the USB device according to input of a trigger signal. In addition, whether the USB hub is to be used is determined by deciding whether the expansion through the USB hub is required according to the allocated exchange number. Thus, a user needs only to arrange each of the expansion modules by a designation.

1 Claim, 8 Drawing Sheets

| Expansion Module Section | Device Connection | Hub IC Operation | Input/Output Signal Connection | USB Address |
|---|---|---|---|---|
| Expansion Module 1 | In1→U1, D1→U2 | Active | D2→Out1, D3→Out2, D4→Out3 | Hub 1, Device 2 |
| Expansion Module 2 | In1→U2 | No Active | In2→Out1, D3→Out2 | Device 3 |
| Expansion Module 3 | In1→U2 | No Active | In2→Out1, D3→Out2 | Device 4 |
| Expansion Module 4 | In1→U1, D1→U2 | Active | D2→Out1, D3→Out2, D4→Out3 | Hub 5, Device 6 |
| Expansion Module 5 | In1→U2 | No Active | In2→Out1, D3→Out2 | Device 7 |
| Expansion Module 6 | In1→U2 | No Active | In2→Out1, D3→Out2 | Device 8 |
| Expansion Module 7 | In1→U1, D1→U2 | Active | D2→Out1, D3→Out2, D4→Out3 | Hub 9, Device 10 |
| Expansion Module 8 | In1→U2 | No Active | In2→Out1, D3→Out2 | Device 11 |
| Expansion Module 9 | In1→U2 | No Active | In2→Out1, D3→Out2 | Device 12 |
| Expansion Module 10 | In1→U1, D1→U2 | Active | D2→Out1, D3→Out2, D4→Out3 | Hub 13, Device 14 |
| Expansion Module 11 | In1→U2 | No Active | In2→Out1, D3→Out2 | Device 15 |
| Expansion Module 12 | In1→U2 | No Active | In2→Out1, D3→Out2 | Device 16 |
| Expansion Module 13 | In1→U1, D1→U2 | Active | D2→Out1, D3→Out2, D4→Out3 | Hub 17, Device 18 |
| Expansion Module 14 | In1→U2 | No Active | In2→Out1, D3→Out2 | Device 19 |
| Expansion Module 15 | In1→U2 | No Active | In2→Out1, D3→Out2 | Device 20 |

EXPANSION MODULE FOR PROGRAMMABLE LOGIC CONTROLLER USING USB COMMUNICATION

Pursuant to 35 U.S.C. § 119(a), this application claims the benefit of earlier filing date and right of priority to Korean Patent Application No. 10-2014-0057035, filed on May 13, 2014, the contents of which are all hereby incorporated by reference herein in its entirety.

BACKGROUND

Field of the Disclosure

Exemplary embodiments of the present disclosure relate to an expansion module for a PLC (Programmable logic Controller). Particularly, the exemplary embodiments of the present disclosure relate to the PLC expansion module sequentially connected to a basic unit configured to transmit/receive massive data at a high speed using USB (Universal Serial Bus) communication.

Discussion of the Related Art

PLCs (Programmable Logic Controller), which are widely used in industrial fields, may be divided into a small size PLC and a medium/large size PLC, by size of the number of input/output control points thereof.

The medium/large size PLC is characterized in that it has numerous expansion modules at a slow data processing speed, because the medium/large size PLC communicates in a bus interface method by installing a module at a base. The small size PLC generally uses a serial interface method through a connector, does not use the base method.

Figure 1:
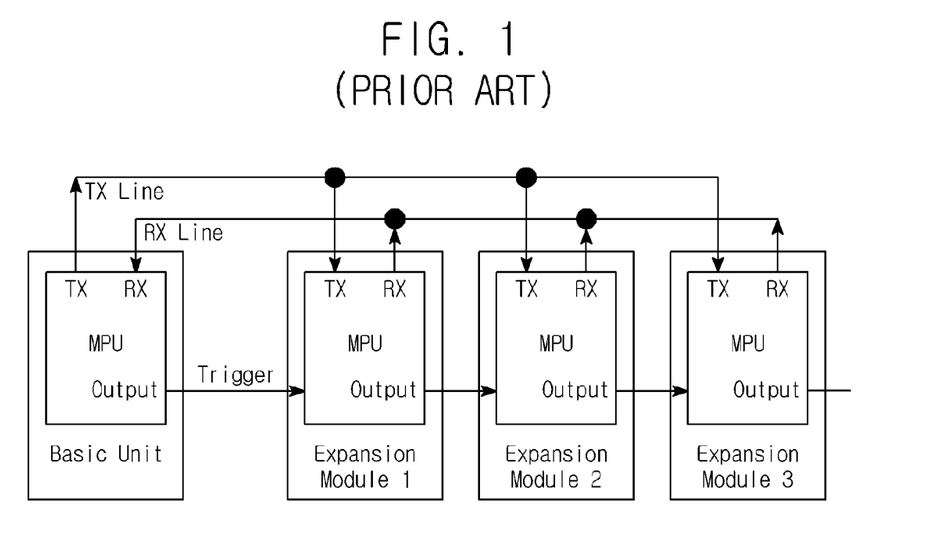
FIG. 1 is an exemplary block diagram illustrating conventional expansion modules using serial connection.

FIG. 1 is an exemplary block diagram illustrating a conventional PLC using serial connection. A number of expansion modules having various functions such as communication and input/output may be sequentially connected to a programmable basic unit.

Here, the basic unit exchanges required data with each of the expansion modules through a serial interface.

The basic unit and each of the expansion modules are connected through signal lines such as transmission (Tx), reception (Rx), Trigger, VCC (IC power-supply pin), and GND (Ground).

Each of the expansion modules receives a Trigger signal in consecutive order, and the basic unit proceeds with an initialization process to sequentially allocate an exchange number to each of the expansion modules.

Each of the expansion modules renders its Tx line in a high impedance state and is on standby during the initialization process. The expansion module responses to the basic unit by opening the Tx line, only when receiving a Trigger signal.

After completing the response to the basic unit, the expansion modules renders the Tx line back to the high impedance state and transmits a Trigger signal to an expansion module in a next terminal.

When such initialization process is completed, each of the expansion modules is allocated with its own exchange number. Afterwards, the basic unit transmits communication data with exchange number information through a Tx line of the basic unit, when the basic unit tries to interface with each of the expansion modules.

Each of the expansion modules receives communication data through a Rx line while being always on standby, and only an expansion module corresponding to exchange number of the relevant data transmits a response data. When the transmission is completed, the Tx line is rendered in a high impedance state for other expansion modules to use.

However, the speed of such conventional interface method is not high. Therefore, there occur problems that scan time of the PLC basic unit is increased and a lot of interface time is consumed when one or more expansion modules requiring massive data process at high speed are installed. Thus, the conventional interface method is hard to apply to the system requiring a high speed control.

SUMMARY OF THE DISCLOSURE

The present disclosure is provided in order to solve the abovementioned problems. One of objects of the present disclosure is to improve data processing speed between a PLC basic unit and an expansion module, by correcting the low speed problem occurring in the conventional serial interface through a USB (Universal Serial Bus) interface.

In a general aspect of the present disclosure, there is provided an expansion module for a PLC (Programmable Logic Controller), used in such a manner that at least one expansion module is sequentially connected to a basic unit having a USB (Universal Serial Bus) host, the expansion module comprising: a USB hub; a USB device; an input socket configured to being connected with a USB signal line for external input; an output socket configured to being connected with a USB signal line for external output; a switching unit configured to connect designated pairs among the input socket, the output socket, each of sockets in the USB hub, and a socket of the USB device; and a controller configured, when a trigger signal is inputted, by forming a USB signal path by controlling the switching unit, to be allocated with an exchange number from the USB host and to deliver the trigger signal to a next terminal.

In some exemplary embodiments of the present disclosure, the USB hub may have k (k is an integer above 3) number of downstream ports, and (k−1) number of the input sockets and the output sockets may be provided, respectively.

In some exemplary embodiments of the present disclosure, the controller may be allocated with a temporary exchange number from the USB host by connecting a designated socket (In1) among the input sockets with the socket (U2) of the USB device, and may process as follows:

(1) The controller disconnects the In1 from the U2, connects the In1 with an upstream port socket (U1) of the USB hub, and is allocated with a new exchange number by applying a reset signal to the USB hub after connecting a designated downstream port socket (D1) of the USB hub to the U2, and connects each of other sockets excluding the D1 among the downstream port sockets of the USB hub respectively with the output sockets according to a designation, when the temporary exchange number is in a range of '1+k*j (j is an integer above zero)'.

(2) The controller continues to use the temporary exchange number as an exchange number of the controller and connects each of other sockets excluding the In1 among the input sockets respectively with the output sockets according to a designation, when the temporary exchange number is out of a range of '1+k*j (j is an integer above zero)'.

According to an exemplary embodiment of the present disclosure, the expansion module for a PLC may process data at a speed higher than the conventional art.

Hardware of the expansion module may be formed simply because each of the expansion modules does not have a lot of input/output signal lines. Especially, production cost of the basic unit may be retrenched, because the number of signal lines from the basic unit to the expansion module is reduced below three.

DETAILED DESCRIPTION

Hereinafter, referring to accompanying drawings, an exemplary embodiment according to the present disclosure will be described in detail.

Figure 2:
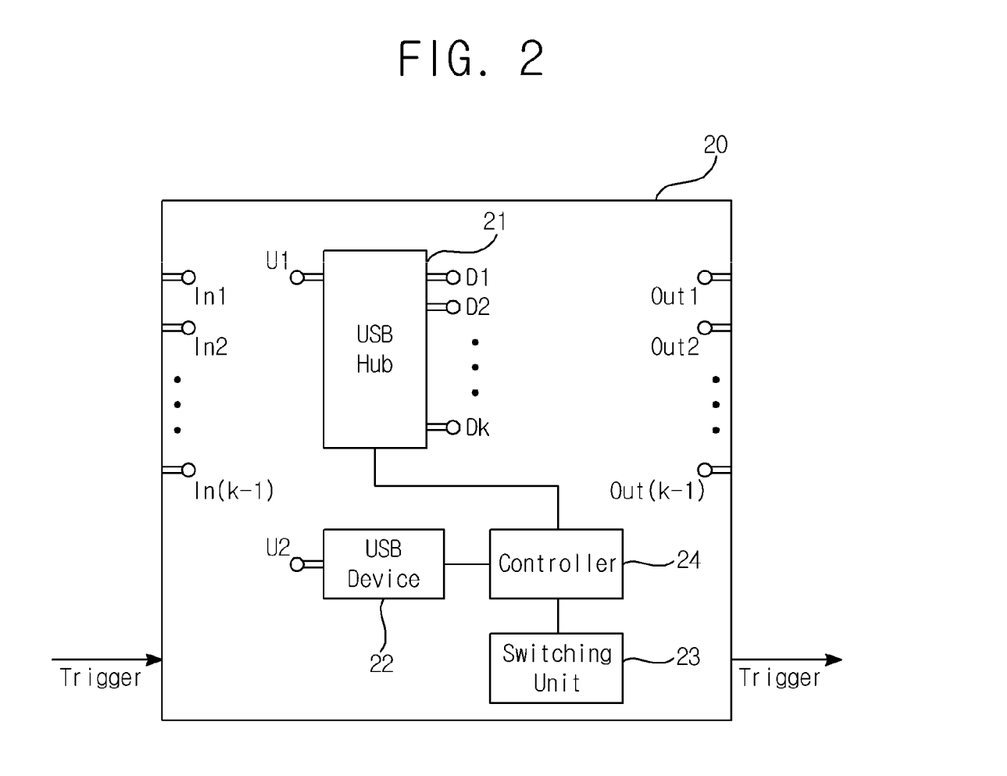
FIG. 2 is a block diagram illustrating an expansion module according to an exemplary embodiment of the present disclosure.

FIG. 2 is a block diagram illustrating an expansion module (20) according to an exemplary embodiment of the present disclosure. The expansion module (20) may be used in such a manner that at least one expansion module is sequentially connected to a basic unit having a USB host, when the expansion module (20) is applied to a PLC. The expansion module (20) may be allocated with its own exchange number according to a trigger signal received from a preceding terminal, and afterwards, may deliver the trigger signal to a following terminal so that the expansion module in the following terminal can be allocated with an exchange number.

When all of the expansion modules are allocated with exchange numbers, a USB host of the basic unit may transmit communication data with the exchange number, and each of the expansion modules may receive the data delivered to itself by using the exchange number allocated thereto.

The expansion module (20) may include a USB hub (21) having k (k is an integer above 3) number of downstream ports, a USB device (22), (k-1) number of input sockets (In1~In(k-1)) and (k-1) number of output sockets (Out1~Out(k-1)) to which USB signal lines are to be connected, a switching unit (23), and a controller (24).

The switching unit (23) may connect each other of the input sockets, the output sockets, each of upstream port sockets and downstream port sockets of the USB hub, and a socket of the USB device, so that a USB signal can be delivered between pairs of the relevant sockets.

The controller (24) may form a USB signal path by activating the USB device (22) and controlling the switching unit (23), when a trigger signal is inputted from a basic unit or another expansion module in the preceding terminal.

In the present disclosure, the value of k may be determined based on the number of downstream ports of the USB hub (21) provided in the expansion module (20). The k may be an integer above three.

Hereinafter, an example where the value of k is 4 will be described. However, the same process may be applied even when the k is 3 or otherwise exceeding 4. Although the USB standard restricts nesting of a USB hub IC up to five terminals in maximum, there is no limit in maximum value of the k so long as the relevant USB hub can be realized, because the USB standard also can be expanded.

Connection order of each expansion module is not predetermined when produced. Any expansion module may be freely arranged.

For example a user who purchased an expansion module may connect the expansion module to a terminal next to the basic unit, or may connect in any arbitrary order. Therefore, the exemplary embodiment to be described in the following may be applied identically to all expansion modules.

Figure 3:
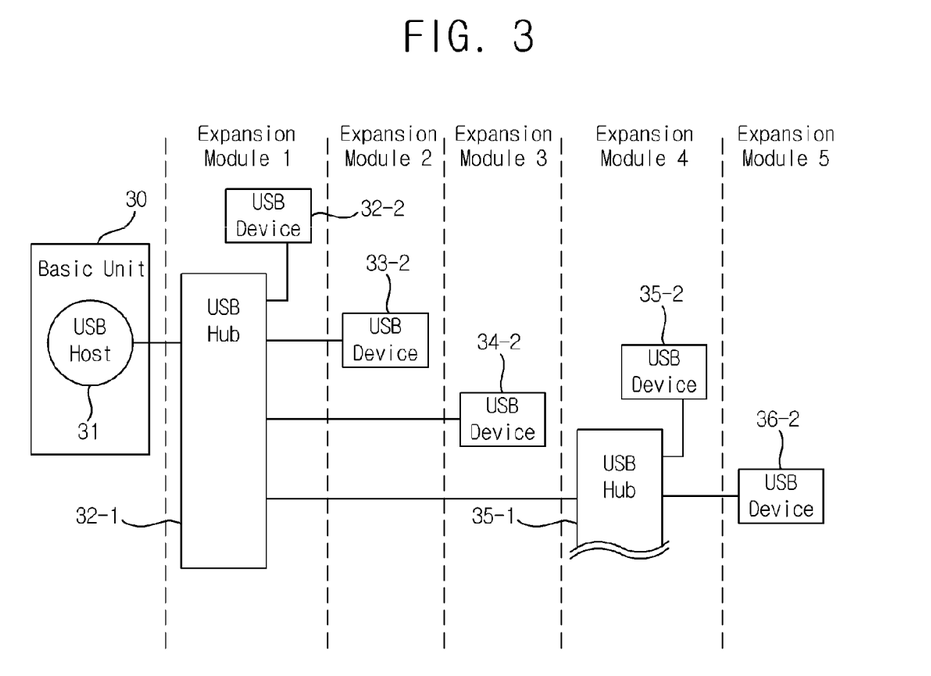
FIG. 3 is a conceptual block diagram illustrating a connection performed according to an exemplary embodiment of the present disclosure.

Referring to FIG. 3, a state of the USB device being recognized when a plurality of expansion modules are connected will be described.

A USB device (32-2) of expansion module 1 connected next to the basic unit (30) is connected to a first downstream port of a USB hub (32-1), a USB device (33-2) of expansion module 2 is connected to a second downstream port of the USB hub (32-1), and a USB device (34-2) of expansion module 3 is connected to a third downstream port of the USB hub (32-1).

Here, the USB hub of the expansion modules 2 and 3 are still inactivated.

For the purpose of making more connections, a USB hub (35-1) of expansion module 4 is activated, and an upstream port of the USB hub (35-1) of expansion module 4 is connected to a fourth downstream port of the USB hub (32-1) of expansion module 1.

Then, the expansion becomes available again by using the USB hub (35-1) of expansion module 4. A USB device (35-2) of expansion module 4 and a USB device (36-2) of expansion module 5 are respectively connected to the USB hub (35-1) of expansion module 4.

Each of the expansion modules are recognized by the USB host (31), whereby such connections are consecutively performed according to a trigger signal, and exchange numbers are allocated accordingly.

For the purpose of detailed description, when the value of k is 4, each name of sockets in the expansion module (20) will be defined as in the following:
three input sockets connected to external input USB signal lines: In1, In2, In3
three output sockets connected to external output USB signal lines: Out1, Out2, Out3
upstream port socket of USB hub: U1
downstream port sockets of USB hub: D1, D2, D3, D4
port socket of USB device: U2

In addition, a designation rule for wiring to connect each of the expansion modules will be assumed as in the following:
Connect only In1 to a USB host of the basic unit, when the expansion module is connected next to the basic unit. Otherwise, respectively connect Out 1~Out 3 in the preceding expansion module to In1~In 3 in the present expansion module.

Figure 7:
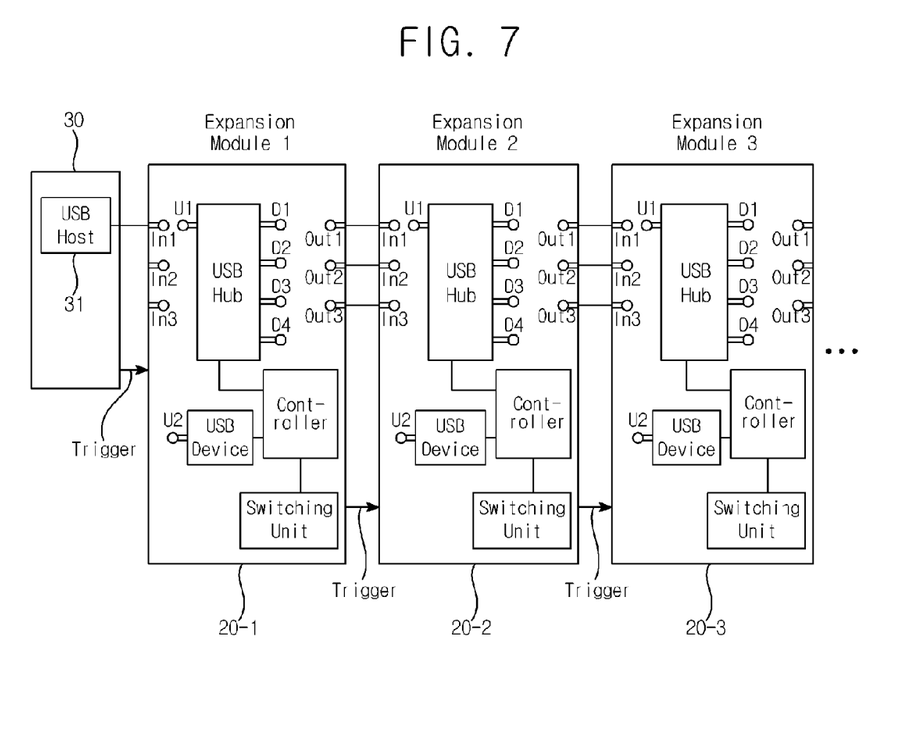
FIG. 7 is a block diagram illustrating expansion modules according to an exemplary embodiment of the present disclosure sequentially connected to a basic unit.

FIG. 7 illustrates an example of expansion modules wired in such method.

Referring FIGS. 4 to 6, a process where the controller (24) performs initialization by controlling internal connection through the switching unit (23) (exchange number obtaining process) will be described in detail.

The controller (24) maintains the USB hub (21) and the USB device (22) as all inactivated.

Figure 4:
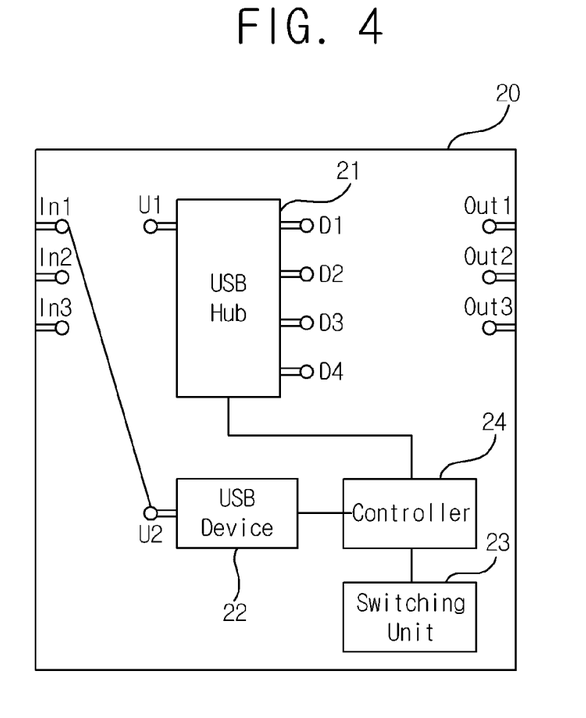
FIGS. 4, 5, and 6 are block diagrams illustrating examples of changes in internal connection states while an expansion module according to an exemplary embodiment of the present disclosure is being allocated with an exchange number.

When a trigger signal is inputted, the controller (24) activates the USB device (22) at first, and connects between In1 and U2 as illustrated in FIG. 4.

Then, the USB host of the basic unit recognizes the USB device (22) and allocates an exchange number. In order to facilitate understanding of the description, the exchange number allocated from the USB host will be referred to as a temporary exchange number.

The controller (24) determines whether the temporary number is any one of '1, 5, 9, 13, 17'. Here, the whether the temporary number is any one of '1, 5, 9, 13, 17' is information notifying whether a state of the USB hub (21) is available to use. That is, in the case when all of downstream ports of the USB hub (21) are used, a new USB hub should be used for the next expansion.

Figure 5:
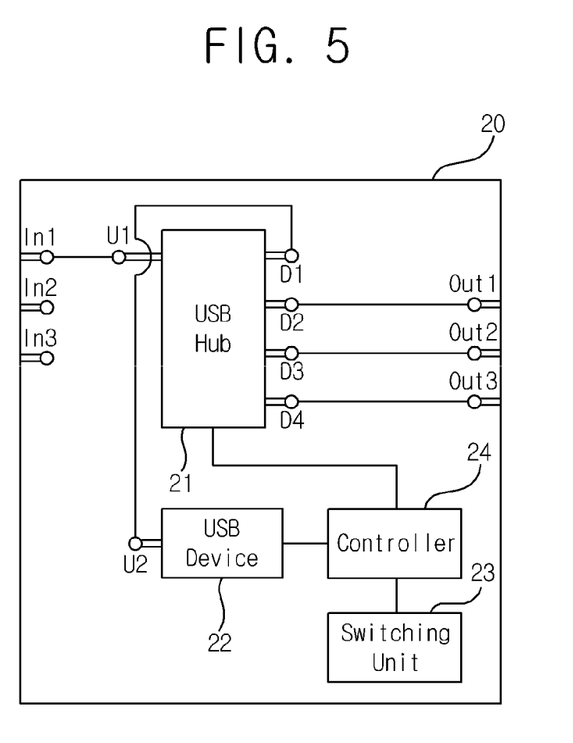

In the case when the temporary exchange number is any one of '1, 5, 9, 13, 17', as illustrated in FIG. 5, the controller (24) disconnects the connection between In1 and U2, connects In1 to U1, and connects D1 to U2.

In addition, the controller (24) renders the USB hub (21) active by applying a reset signal to the USB hub (21) after disconnecting the connection with the USB host. Then, the USB host recognizes the USB hub (21), and allocates a new exchange number.

Here, two exchange numbers are sequentially allocated, because there are two USB instruments (a USB hub and a USB device).

For example, in the case when the expansion module is connected next to the basic unit, an exchange number '1' is allocated to the USB hub and '2' is allocated to the USB device.

The controller (24) uses the exchange number newly allocated from the USB host as an exchange number for itself, and connects D2, D3, and D4 to Out1, Out2, and Out3, respectively.

Figure 6:
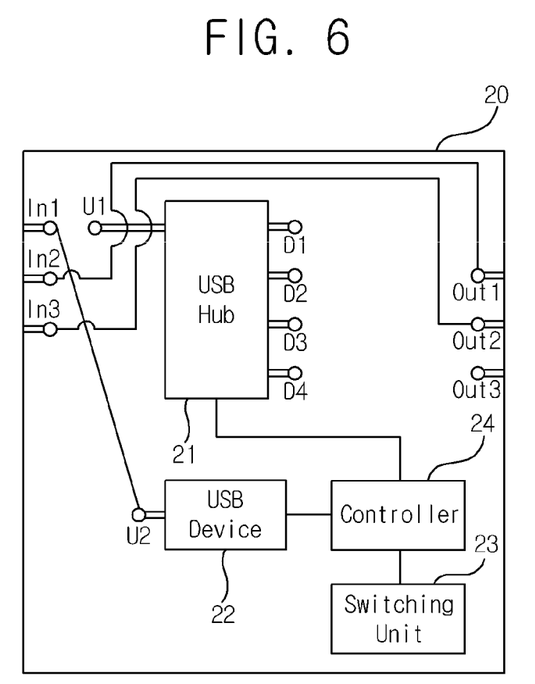

However, in the case when the temporary exchange number is not any one of '1, 5, 9, 13, 17', the controller (24) successively uses the temporary exchange number as an exchange number for itself, and respectively connects In2 and In3 to Out1 and Out 2, as illustrated in FIG. 6. At this moment, In1 and U2 have already been connected during the process of being allocated with the temporary exchange number.

The controller (24) maintains the USB hub (21) active, when its exchange number is any one of '1, 5, 9, 13, 17'. Otherwise, the controller (24) maintains the USB hub (21) inactive.

Figure 8:
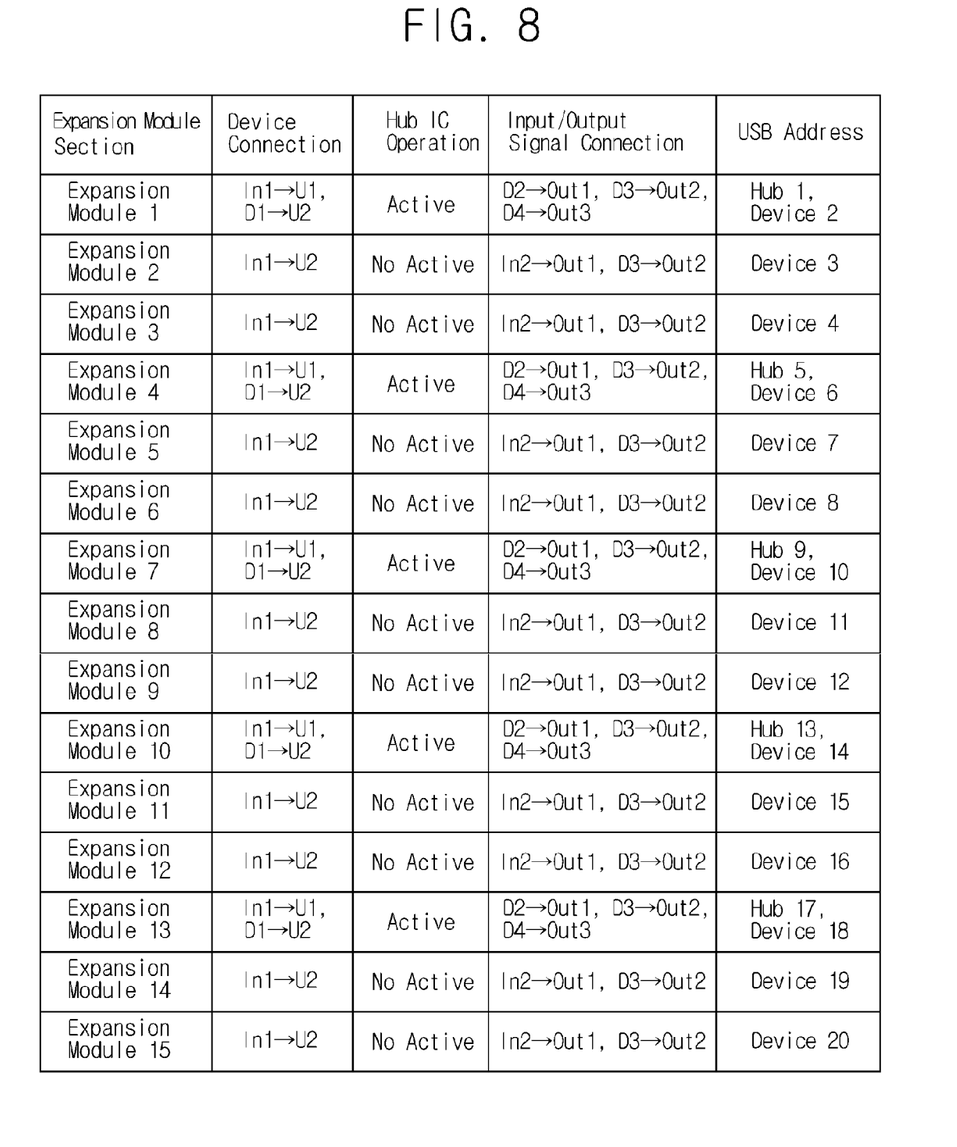
FIG. 8 is a table illustrating connection methods in each of expansion modules according to an exemplary embodiment of the present disclosure.

FIG. 7 illustrates an example where a plurality of expansion modules (20-1, 20-2, 20-3) are connected to the basic unit. FIG. 8 is a table illustrating a list of connection relationship relating to the USB device, operation of the USB hub, input/output signal connection relationship, and allocated exchange number (USB address), in response to each of the expansion modules.

As illustrated in FIG. 7, when each of the expansion modules (20-1,20-2,20-3) is sequentially connected from the basic unit (30) according to the designation rule for wiring, the USB host (31) of the basic unit (30) consecutively allocates exchange numbers to enable high Speed USB communication.

Each of the expansion modules (20-1, 20-2, 20-3) receives input signals In1~In3 and a trigger signal, and transmits output signals Out1~Out3 and a trigger signal. When the preceding terminal is a basic unit (30), the expansion module only needs to receive an input signal In1 and a trigger signal.

Here, the expansion module 1 (20-1) has an internal connection structure as illustrated in FIG. 5, because the expansion module 1 (20-1) uses a USB hub. The expansion module 2 (20-2) and the expansion module 3 (20-3) has an internal connection structure as illustrated in FIG. 6, because the expansion modules 2 and 3 (20-2, 20-3) do not use a USB hub. Such internal connection relationships are illustrated in FIG. 8 in detail.

The basic unit (30) may be formed by using a USB host IC or an MPU (Micro Processing Unit) installed with a USB host function.

Each of the expansion modules has all identical structure so as to be installed at any position, and may be formed by using a USB hub and a USB host IC (or an MPU with a USB host function).

Each of the expansion modules (20-1, 20-2, 20-3) may be identified by the exchange number allocated from the USB host (31), and in response to the identified exchange number, may be connected with signal lines according to the method illustrated in FIG. 8.

As illustrated in FIG. 8, there is only one difference between the expansion modules in whether the expansion module should use a USB hub or not. All of the expansion modules 1, 4, 7, 10, and 13 have identical connection structures. The other expansion modules also have identical connection structures one another.

Each of the expansion modules which should use a USB hub is allocated with two exchange numbers. For example, for expansion module 1, an exchange number 1 is allocated to the USB hub and an exchange number 2 is allocated to the USB device therein. For expansion module 4, an exchange number 5 is allocated to the USB hub and an exchange number 6 is allocated to the USB device therein.

The exemplary embodiments described in the above are proposed in order to facilitate understanding of the present disclosure. Thus, the present disclosure is not limited by the exemplary embodiments described in the above. Therefore, it will be apparent that the persons who skilled in the art of the present invention may easily perform various transformed or modified embodiments within the limit of the claimed technical spirit of the present disclosure.

What is claimed is:

1. An expansion module for a PLC (Programmable Logic Controller), the expansion module at least one expansion module is-sequentially connected to a basic unit having a USB (Universal Serial Bus) host, the expansion module comprising: a USB hub including sockets; a USB device including sockets; a plurality of input sockets connected to a USB signal line to receive external input; a plurality of output sockets connected with a USB signal line to transmit external output; a switching unit configured to connect designated pairs among the plurality of input sockets, the plurality of output sockets, each of the sockets in the USB hub, and one of the sockets of the USB device; and a controller configured to: control the switching unit to form a USB signal path when a trigger signal is received such that the controller is allocated with a temporary exchange number from the USB host; and provide the trigger signal to a next terminal, wherein the USB hub has k downstream ports, wherein the expansion module includes k−1 input sockets and k−1 output sockets, wherein k is an integer greater than 3, wherein allocating the temporary exchange number comprises connecting a designated socket of the plurality of input sockets to a socket of the USB device, wherein the controller is further configured to: determine that the temporary exchange number is 1, 5, 9, 13 or 17, disconnect the designated socket from the socket of the USB device, connect the designated socket to an upstream port socket of the USB hub, and be allocated a new exchange number by applying a reset signal to the USB hub after connecting a designated downstream port socket of the USB hub to the socket of the USB device and connecting each downstream port sockets of the USB hub excluding the designated downstream port socket to a corresponding one of the plurality of output sockets according to a first designation; and determine that the temporary exchange number is not 1, 5, 9, 13 or 17, use the previously allocated temporary exchange number and connect each of the plurality of input sockets excluding the designated socket to a corresponding one of the plurality of output sockets according to a second designation.

* * * * *